United States Patent [19]

Karlin et al.

[11] Patent Number: 4,763,924
[45] Date of Patent: Aug. 16, 1988

[54] SEAT MOVEMENT RESPONSIVE BELT TENSIONING ARM

[75] Inventors: Mats A. Karlin, Vargarda, Sweden; Per O. Weman, Heverlee, Belgium

[73] Assignee: Autoliv Development AB., Vargarda, Sweden

[21] Appl. No.: 9035,988

[22] Filed: Nov. 28, 1986

[30] Foreign Application Priority Data

Nov. 29, 1985 [GB] United Kingdom ................. 8529378

[51] Int. Cl.⁴ ........................ B60N 1/02; B60R 22/32
[52] U.S. Cl. .................................. 280/806; 297/468; 297/216
[58] Field of Search ................ 280/801, 806; 297/216, 297/480, 468; 180/268; 464/33

[56] References Cited

U.S. PATENT DOCUMENTS 2,438,676  3/1948  Nickle et al. .......................... 464/33
3,806,191  4/1974  Stegmaier ........................... 297/216

FOREIGN PATENT DOCUMENTS 0195268  9/1986  European Pat. Off. ............ 280/806
7510005  3/1976  Netherlands ........................ 297/480

Primary Examiner—John J. Love
Assistant Examiner—Karin L. Ferriter
Attorney, Agent, or Firm—Spencer & Frank

[57] ABSTRACT

A safety device is disclosed which is incorporated in a seat for a motor vehicle. The seat includes a seat frame and is slidably mounted for forward and backward movement. The seat is retained in a predetermined position by retaining means which are adapted to be released when the seat is subjected to predetermined deceleration forces is that the seat may then slide forward. The safety device has actuating means which are adapted to actuate the safety device as the car seat slides forward subsequent to the release of the retaining means.

20 Claims, 2 Drawing Sheets

SEAT MOVEMENT RESPONSIVE BELT TENSIONING ARM

BACKGROUND TO THE INVENTION

The present invention relates to a safety device for use with a vehicle seat, and more particularly to a safety device in the form of a seat belt pretensioner or an anti-submarining plate.

In the event of an accident occuring involving a motor vehicle, the vehicle can be decelerated rapidly and brought to rest in a very short period of time. In such circumstances the passengers within the vehicle will possess their own momentum which, as the vehicle is brought to rest, will tend to thrust the passengers forward relatively to the vehicle. Unless suitably restrained, the passengers can be thrust against the vehicle dashboard or through the windscreen. Vehicle seat belts are intended to retain the occupants of the vehicle in their seats in the event of the vehicle being brought to rest very suddenly.

DISCUSSION OF THE PRIOR ART

Conventional seat belts are often wound on an inertia reel and even when the inertia reel locks in the event of an accident it is still possible for a length of belt to be paid out by the reel due to the magnitude of the force exerted on the belt by the weight of the passenger thrust forward.

Conventional seat belts are formed from a material which is slightly elastic, and thus even when the inertia reel is locked it is possible for the passenger to move forward slightly due to the stretching of the seat belt.

In an attempt to overcome such problems it has been proposed to provide a safety belt arrangement with a belt pre-tensioner. The proposed arrangement incorporates a vehicle deceleration sensor which activates the tensioner when the vehicle deceleration exceeds a predetermined rate so that the belt is pulled tight around the passenger in an attempt to retain the passenger in the vehicle seat.

Alternative prior proposed arrangements have included means for tightening a seat belt around a passenger, the tightening means being responsive to vehicle damage. Such an arrangement has included wires connecting the seat belt to the vehicle chassis in such a way that if the chassis is deformed in an accident the wires move to tighten the seat belt. An obvious disadvantage of tensioners which are responsive to vehicle damage is that the seat belt is not placed under tension until the moment of impact. In the event of the driver of a vehicle braking heavily before an accident, it is desirable for the seat belt to be tightened during braking of the vehicle.

An alternative arrangement, which suffers from a similar disadvantage, comprises pistons located within cylinders mounted behind a bumper on the front of the vehicle, these pistons and cylinder powering a slave cylinder which tightens the seat belt if the bumper is moved towards the body of the vehicle.

It has been proposed to equip vehicle seats with an anti-submarining plate to prevent the passengers from sliding underneath the seat belt strap in the event of an accident. Such a plate is usually rigid and is fitted underneath the vehicle seat at a position remote from the seat surface so as not to detract from the comfort of the seat. The plate is associated with means which, in the event of an accident raise the plate in a direction towards the seat surface in order to prevent the passenger from sinking into the soft material forming the seat surface and thus sliding underneath the seat belt strap.

BRIEF SUMMARY OF THE INVENTION

According to this invention there is provided a safety device incorporated in a seat for a motor vehicle, said seat incorporating a seat frame and being slidably mounted for forward and backward movement, there being retaining means to retain the seat in a predetermined position, the retaining means being adapted to be released when the seat is subjected to predetermined decelerational forces to permit the seat to slide forwardly, the safety device having actuating means which are adapted to actuate the safety device as the seat slides forwardly subsequent to the release of the retaining means.

Preferably the means slidably mounting the seat comprise a member located adjacent part of the seat frame, relative to which the seat may slidably move when subjected to said predetermined decelerational forces, there being respective coaligned apertures formed in the said seat and the member, one of said apertures being of elongate configuration, the axis of said elongate aperture extending in the forward direction, there being bolts or similar retaining means passing through the coaligned apertures to secure the seat and the member together.

Conveniently the member comprises a slider mounted upon a rail, the slider being adapted to be selectively positioned on the rail.

Advantageously the retaining means comprise an element having a predetermined mechanical strenght, the strength of the element being such that the element will break when the seat is subjected to said predetermined decelerational forces, thus permitting the seat to slide forwardly.

Preferably said element comprises an elongate element passing through coaligned apertures formed in the frame of the seat and in a component relative to which the seat may slide when the seat is subjected to said predetermined decelerational forces.

Conveniently said component is mounted on or formed integrally with said member.

Advantageously said elongate element is provided with a region of mechanical weakness intermediate the ends thereof.

Preferably said elongate element has substantially cylindrical end regions and a peripheral groove defining a relatively narrow waist which constitutes said region of mechanical weakness.

Conveniently said elongate element is provided with an enlarged head at one end thereof, the region adjacent said one end passing through a housing having a portion engaging said enlarged head, there being resilient means within the housing serving to bias the housing away from the coaligned apertures in the seat frame and the member through which the elongate element passes, the other end of the element being associated with a further housing which is retained on the element by means engaging the elongate element and the housing.

Preferably the frame is provided with protruding abutment means which engage part of the safety device to retain the safety device in an inoperative position until said seat slides forwardly.

Conveniently said stop is constituted by said element or a housing mounted thereon.

Advantageously the safety device incorporates a movable member associated with means to bias the movable member to an operative position, the movable member forming part of the safety device, the movable member being retained in the inoperative position by engagement with said stop until said seat slides forwardly.

Preferably the movable member is associated with a torsion bar adapted to apply a bias to the movable member.

Conveniently the movable member consists of an elongate pivoted lever which is acted upon by a further lever or element associated with a torque bar, the elongate lever thus serving to amplify the movement of the member or lever associated with the torque bar.

Advantageously the movable member is associated with a buckle for a safety belt, the safety device thus constituting a seat belt pretensioner.

Advantageously the movable member is associated with an anti-submarining plate.

BRIEF DESCRIPTION OF THE DRAWINGS

In order that the present invention may be more readily understood and so that further features thereof may be appreciated, the invention will now be described by way of example with reference to the accompanying figures in which.

DESCRIPTION OF PREFERRED EMBODIMENT

Figure 1:
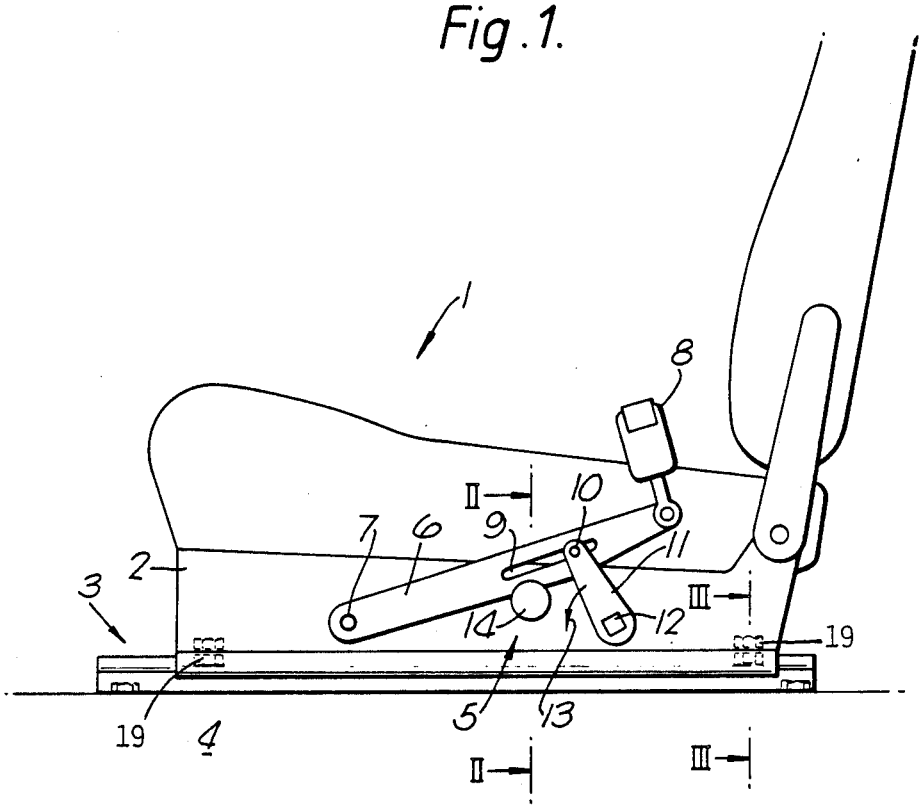
FIG. 1 is a side elevation of a vehicle seat and an associated seat belt pre-tensioner in accordance with the present invention.

Referring now to the drawings, a vehicle seat 1 has a sub-frame 2 which is mounted on a rail arrangement 3 which, in turn, is mounted to the chassis 4 of a vehicle. The seat is fitted with a seat belt (not shown) and a seat belt pre-tensioning device 5. The pre-tensioning device 5 comprises an arm 6 one end of which is mounted pivotally on the sub-frame 2 by way of a pin 7 so that the arm 6 can pivot in a vertical plane. Connected to the other end of the arm 6 is a buckle 8 adapted to receive the tongue of a seat belt. The arm 6 is formed with an elongate axial slot 9 into which is fitted a pin 10, which can slide along the slot. The pin 10 is mounted on one end of a biassing member 11, which is in the form of a lever which is also mounted on the seat sub-frame for pivoting movement in a vertical plane. The other end of the biassing member is mounted on a square section torsion bar 12 which biases the member 11 in the direction indicated by the arrow 13, the torsion bar extending horizontally under the seat 1. The end of the torsion bar 12 remote from the member 11 is rigidly connected to the frame 2 of the seat 1. The arm 6 is retained in an upper position (as shown in FIG. 1) by means of a stop constituted by a pin 14 which extends through the frame 2 of the seat 1, the arm 6 resting upon a housing 15 provided around the pin 14.

Figure 2:
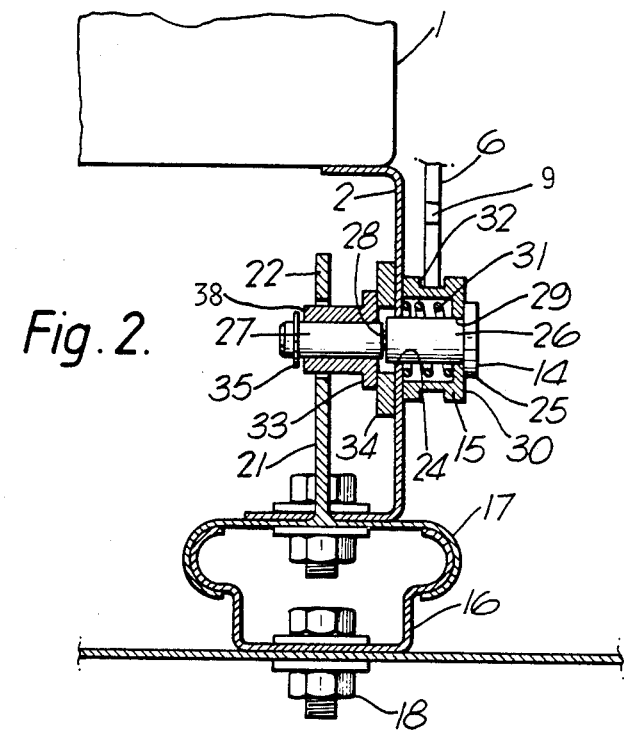
FIG. 2 is a sectional view taken on line II—II in FIG. 1, showing the seat mounting arrangement.
Figure 3:
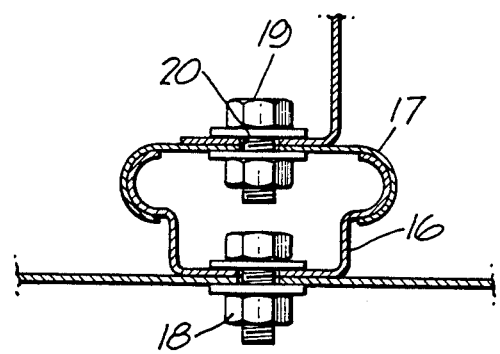
FIG. 3 is a sectional view taken on the line III—III in FIG. 1.

FIGS. 2 and 3 shows the rail arrangement 3 which comprises a rail 16 and an upper slider 17 mounted on the rail 16. The rail 16 is a thin section U shaped rail with semi-circular projections at the ends of each of the arms of the U. The rail 16 is mounted on the chassis of a vehicle by means of bolts 18. The slider 17 is also of thin section inverted channel configuration, the channel having semi-circular side walls designed to envelope the corresponding projections on the arms of the rail 16, so that the slider 17 may be slidingly moved along the rail 16 in order to adjust the position of the seat mounted on the rail arrangement 3. Manually operable means of a conventional design may be provided to secure the slider 17 at a selected position on the rail 16. Thus the position of the seat 1 may be selectively adjusted to permit the seat to be occupied comfortably by a person of any particular height.

The bottom portion of the sub-frame 2 of the seat 1 comprises a depending side wall terminating with an inwardly directed flange. The subframe 2 is connected to the slider 17 by means of bolts 19 which pass through an elongate slot 20 in the inwardly directed flange of the frame 2 and through a circular hole in the slider 17. As can be seen from FIG. 1 two such securing bolts 19 are provided on each side of the seat one at the front and one at the rear of the frame 2. Initially each bolt is at the rear end of the corrresponding elongate slot 20.

It will be appreciated that, as so far described, if the bolts were loose it would be possible to move the vehicle seat 1 forwards or backwards, slightly relative to the slider 17 due to the slots 20 being elongate. However the bolts are tightened sufficiently to prevent this movement under ordinary circumstances, although, as will be described, this movement can occur in special circumstances.

Formed integrally with the slider 17, in a central region thereof, is an upwardly projecting thin wall 21. The thin wall 21 is provided with an aperture 22 neat its top end. The sub-frame 2 of the seat 1 is provided with an aperture 24, which, as illustrated, is aligned with the aperture 22 in the wall 21. The pin 14 which normally retains the arm 6 in the upper position passes through the aperture 24 in the frame 2 and also through the aperture 22 in the wall 21. The pin 14 has a stepped cylindrical section body and is provided with a flattened enlarged head 25 at one end. The body portion 26 adjacent the head 25 of the pin 14 is of greater diameter than the body portion 27 which is remote from the pin head 25. The step in the pin body is weakened by a peripheral groove 28 running around the pin body at the step junction, so that the diameter of the pin in the region of the step is very small.

In order to retain the pin 14 in position the housing 15 and a further housing 38 are provided. The housing 15 is in the form of a cylindrical hollow cap, open at one end, the closed end being provided with an aperture 29 through which the body of th epin 14 can be inserted, thus allowing the head 25 of the pin 14 to engage against the outer surface 30 of the closed end of the housing 15. The hollow interior of the housing 15 contains a compressed compression spring 31 which surrounds the body portion 26 of the pin which is accommodated withint he housing 15. The compression spring engages the closed end of the cap, and also engages one side of the sub frame 2. The pin 14 passes through the aperture 24. A peripheral groove 32 is provided in the housing 15 to receive one side edge of the arm 6, in order to prevent excessive sideways movement of the arm 6.

The body portion 27 of the pin 14 which projects through the aperture 24 is surrounded by a cylindrical section housing 38 which passes closely through the bore 22 in the wall 21 on the slider 17. One end of the cylindrical housing 38 is provided with a flange portion 33, the outer face of which rests against a washer 34 which abuts against the frame 2 of the seat 1. The internal diameter of the washer 34 is greater than the diameter of the body portion 26 of the pin 14 and thus a space is provided around the step junction in the pin body. The pin 14 is secured axially at its end remote from the pin head 25 by means of a circlip 35 which is mounted on the pin end engages the unflanged end of the housing 28, or by any other suitable means, thus retaining the compression spring 31 in a compressed state.

It will be appreciated that the pin arrangement shown in FIG. 3 helps prevent relative movement between the seat 1 and the rail arrangement 3.

In the event of an accident the apparatus is intended to operate in the following manner. When the vehicle decelerates rapidly or comes to rest suddenly a passenger in the seats will tend to be thrust forward as a result of the momentum that the passenger will possess. As the vehicle decelrates, if the deceleration exceeds a predetermined level the bolts 19 will not be able to prevent relative movement between the slider and the sub-frame 2 and thus the sub-frame 2 will tend to move forwardly thus moving the pin 14 and the associated housings forwardly until the housing 38 surroounding the body portion 27 of the pin 14 engages the inner periphery of the bore 22 in the wall 21 attached to the slider 17. If the rate of deceleration of the vehicle exceeds a predetermined level then the pin 14 will shear at the step joint, where it is weakened by the peripheral groove 28, since the body portion 26 of the pin 14 is attached to the seat frame 2 which is attempting to move forward and the body portion 27 of the pin 14 is fixed within the aperture 22 in the wall 21 which is mounted on the slider 17 which remains stationary. When the pin 14 breaks, the part of the pin which is located on the right of the seat frame 2, as shown in FIG. 2, will fall away from the frame, with the assistance of the spring 31 which will then be able to expand, thus allowing the arm 6 to move in a downward direction under the action of the biassing member 11. This downward movement of the arm 6 pulls the buckle 8 attached to the upper end of the arm 6 in a downward direction. Thus when the vehicle decelerates very suddenly a seat belt attached to the buckle 8 will be pulled tightly around a passenger sitting in the seat 1, thus being pretensioned to help retain the passenger firmly in the seat during the accident.

It is to be appreciated that the bolts 19 may, in an alternative embodiment, be under such a torque that they do not hinder or restrain relative movement between the sub-frame 2 and the slider 17. In such an embodiment the only item then that retains the seat in its initial predetermined position relative to the slider is the pin 14 and the associated housings.

It will be appreciated that many minor modifications can be made to the specific embodiment described without departing from the scope of the present invention. For example, it would be possible to mount the pin 14 so that it retains the biassing member 11 in an upper position rather than retaining the arm 6 in an upper position. It would also be possible to mount the seat belt buckle 8 directly on the biassing member 11 although it is desirable to mount the buckle 8 as described in the specific embodiment since the arm 6 then provides an amplification of movement, i.e. the seat belt is tightened more than would be the case if the buckle 8 were mounted directly on the biassing member 11. It will also be feasible to provide means other than the torsion bar 12 in order to achieve the biassing effect. For example, spring means could also provide the desired effect.

Whilst the present invention has been described in association with a seat belt pre-tensioner, it will be realised that the arrangement shown in FIG. 2 could readily be modified to activate an anti-submarining plate, or some other form of safety device connected with a vehicle seat, in response to excessive vehicle deceleration.

What is claimed is:

1. A safety device in combination with a seat for a motor vehicle, wherein said seat includes a seat frame incorporated in said seat, said seat being slidably mounted for forward and backward movement; and retaining means for retaining said seat in a predetermined position and releasing said seat for forward movement when said seat is subjected to a deceleration force that exceeds a predetermined amount, said safety device comprising:
   a seat belt associated with said seat;
   a movable member engaging said seat belt; and
   means for moving said movable member to apply a tension to said seat belt when said seat slides forward subsequent to the release of said retaining means.

2. A safety device according to claim 1, further comprising a rail and a slidable member slidably mounted on said rail, said seat being retained by said retaining means on said slidable member and selectively positionable on said rail.

3. A safety device according to claim 2, further comprising means for slidably mounting said seat, said slidably mounting means comprising a member located adjacent a portion of said seat frame, said seat being movable relative to said member when said seat is subject to a deceleration force that excces the predetermined amount; said seat frame and said member including means for defining respective coaligned apertures with one of said apertures being of elongate configuration and having an axis extending in a forward direction; and securing means passing through said apertures to secure said seat and said member together.

4. A safety device according to claim 3, wherein said retaining means includes an element having a predetermined mechanical strength, the strength of said element being such that said element will break when said seat is subjected to a deceleration force that exceeds the predetermined amount thereby allowing said seat to slide forward.

5. A safety device according to claim 4, further comprising a component located adjacent a further portion of said seat frame; said seat fram and said component including means for defining respective coaligned openings; and wherein said element comprises an elongate element which passes through said openings.

6. A safety device according to claim 5, wherein said component is attached to said member.

7. A safety device according to claim 5, wherein said elongate element includes ends and a region of mechanical weakness between said ends.

8. A safety device according to claim 7, wherein said ends are substantially cylindrical, each said end having a respective first diameter and said region of mechanical weakness having a second diameter which is less than said respective first diameters.

9. A safety device according to claim 5, further comprising a first and second housing, said housings being coaxially disposed around said elongate element, said elongate element including an enlarged head at one end thereof, wherein said elongate head engages a portion of said first housing, said first housing including a resilient means disposed therein for biasing said first housing away from said coaligned openings in said seat and said component; and second housing retaining means for retaining said second housing on said elongate element by engaging said elongate element and a portion of said second housing.

10. A safety device according to claim 1, wherein said frame includes protruding abutment means for engaging said movable member to retain said safety device in an inoperative position until said seat slides forward.

11. A safety device according to claim 10, wherein said abutment means includes an element engageable with said movable member.

12. A safety device according to claim 10, wherein said abutment means includes a housing engageable with said movable member.

13. A safety device according to claim 10, wherein said movable member is retained in said inoperative position by engagement with said abutment means until said seat slides forward.

14. A safety device according to claim 1, further comprising means for slidably mouting said seat, said slidably mounting means comprising a member located adjacent a portion of said seat frame, said seat being movable relative to said member when said seat is subjected to a deceleration force that exceeds the predetermined amount; said seat frame and said member including means for defining respective coaligned apertures with one of said apertures being of elongate configuration and having an axis extending in a forward direction; and securing means passing through said apertures to secure said seat and said member together.

15. A safety device according to claim 14, wherein said retaining means includes an element having a predetermined mechanical strength, the strength of said element being selected so that said element will break when said seat is subjected to a deceleration force that exceeds the predetermined amount thereby allowing said seat to slide forward.

16. A safety device according to claim 15, further comprising a component located adjacent a further portion of said seat frame, said seat frame and said component including means for defining respective coaligned openings; and wherein said element comprises an elongate element which passes through said openings.

17. A safety device according to claim 16, wherein said component is attached to said member.

18. A safety device according to claim 16, wherein said elongate element includes ends and a region of mechanical weakness between said ends.

19. A safety device according to claim 18, wherein said ends are substantially cylindrical, each said end having a respective first diameter and said region of mechanical weakness having a second diameter which is less than said respective first diameters.

20. A safety device according to claim 16, further comprising a first and second housing, said housings being coaxially disposed around said elongate element, said elongate element includng an enlarged head at one end thereof, wherein said elongate head engages a portion of said first housing, said first housing including a resilient means disposed therein for biasing said first housing away from said coaligned openings in said seat and said component; and second housing retaining means for retaining said second housing on said elongate element by engaging said elongate element and a portion of said second housing.

* * * * *